INVENTOR.
MERLE E. BIGELOW
BY CORBETT, MAHONEY,
MILLER & RAMBO ATTYS.

April 18, 1961 M. E. BIGELOW 2,979,854
ANIMAL TRAPS
Filed Sept. 30, 1958 3 Sheets-Sheet 3

INVENTOR.
MERLE E. BIGELOW
BY CORBETT, MAHONEY,
MILLER & RAMBO, ATTY'S.
BY

United States Patent Office 2,979,854
Patented Apr. 18, 1961

2,979,854

ANIMAL TRAPS

Merle E. Bigelow, 305 W. 3rd St., Marysville, Ohio; Bertha Bigelow, administratrix of said Merle E. Bigelow, deceased Filed Sept. 30, 1958, Ser. No. 764,304

9 Claims. (Cl. 43—90)

My invention relates to animal traps. It has to do, more particularly with an animal trap of the type embodying a pair of ring-like jaw members which are arranged for relative rotation about a common diametrical axis, and which employ coiled torsion springs, to impart relative rotation to the separate circular jaw members, upon the release of a suitable trigger mechanism by an animal coming into contact with such trigger mechanism whereby the circular jaws of the trap will be closed upon such animal to kill the same.

Traps of this general type have been employed in the past in the animal trapping art with efficiency. One particular type of trap in which this general structure is embodied is illustrated in my previously issued Patent No. 2,543,826, dated March 6, 1951.

The present invention relates mainly to a novel pivot and connecting arrangement between the two rings whereby the ring-like jaws themselves provide a spring tension which aids in the moving of the jaws towards each other when the jaws pass beyond the halfway or dead-center position in their relative movement into closed sprung position and open cocked position. The trap of this invention is further characterized by its relative simple and inexpensive to manufacture structure, its relative ease of operation in initially setting the trap, and its efficient functioning to quickly and tightly trap an animal between the jaws of the trap in a manner which precludes any possibility of the escape of the animal when once lodged between the circular jaw members of the trap.

Various other objects and advantages will be apparent as this description progresses.

In the accompanying drawings, I have illustrated the preferred embodiment of my invention, but it is to be understood that specific details thereof may be varied without departing from basic principles of the invention.

Figure 1:
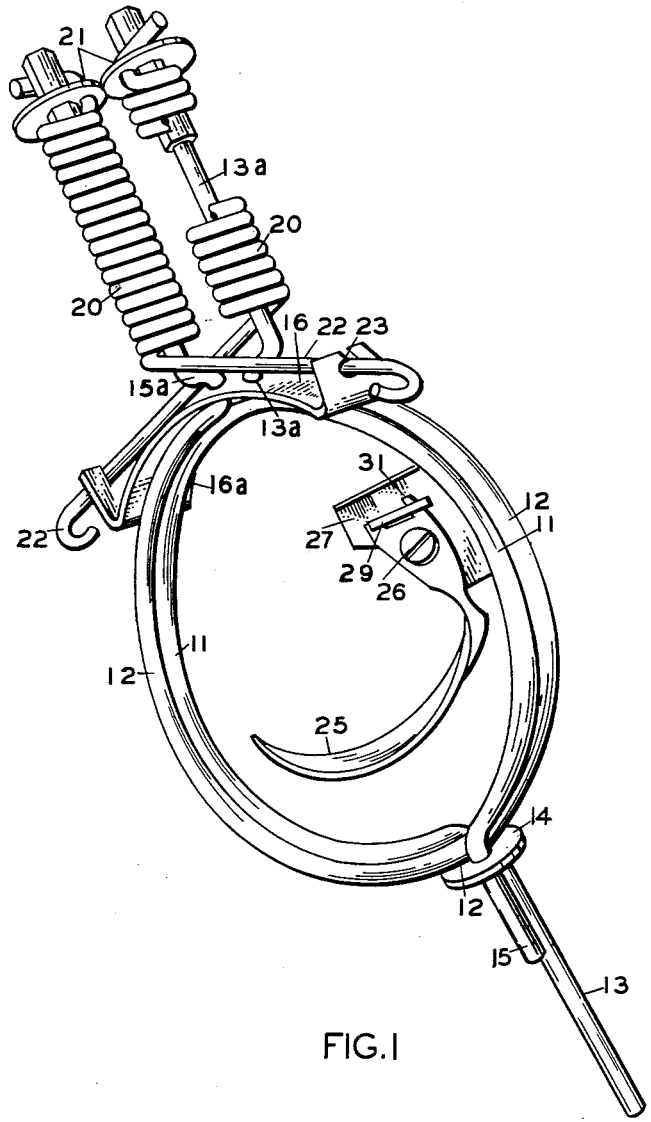
Figure 1 is a perspective view of a trap embodying my invention showing the trap in set condition.

With reference to the drawings, I have illustrated the trap as being composed mainly of the two split-ring jaw members 11 and 12. These members are preferably formed of resilient heavy steel wire so that when they are pivotally connected together in the manner indicated in the drawings, they will provide spring tension for aiding the relative movements of the jaws. The two rings 11 and 12, before assembly, are illustrated respectively in Figures 6 and 7.

The two rings 11 and 12 are interfitted together so that one-half of each ring, as divided by the pivot axis, is at opposite faces of the cooperating ring. The two rings 11 and 12 are pivoted together for swinging movement about a diametrically disposed axis through an angle of 180° from set to sprung positions and in both positions they will be in substantial circumferential coincidence but each half of each ring, as divided by the pivot axis, will move between positions at opposite sides of the pivot axis into association with the same face of the cooperating ring.

With reference to Figure 1, which shows the trap in set position, it will be apparent that the ring 11 at its split side has a depending pivot extension 13 which is continued downwardly to provide a prong adapted to be forced into the ground to set the trap upright. The extension 13 extends upwardly through a pivot button disc 14, attached to the closed side of the ring 12, and the ring 11 continues upwardly around and then down to a stub pivot extension 15 which is disposed parallel to the extension 13 being in front of it in Figure 1 and behind it in Figure 2. As shown in the drawings, these pivot extensions 13 and 15 pass through pivot openings in the button 14 which are diametrically opposed on opposite sides of the center of the button disc 14. Thus, both ends of the split ring 11 are carried in pivot openings in the disc 14.

Figure 2:
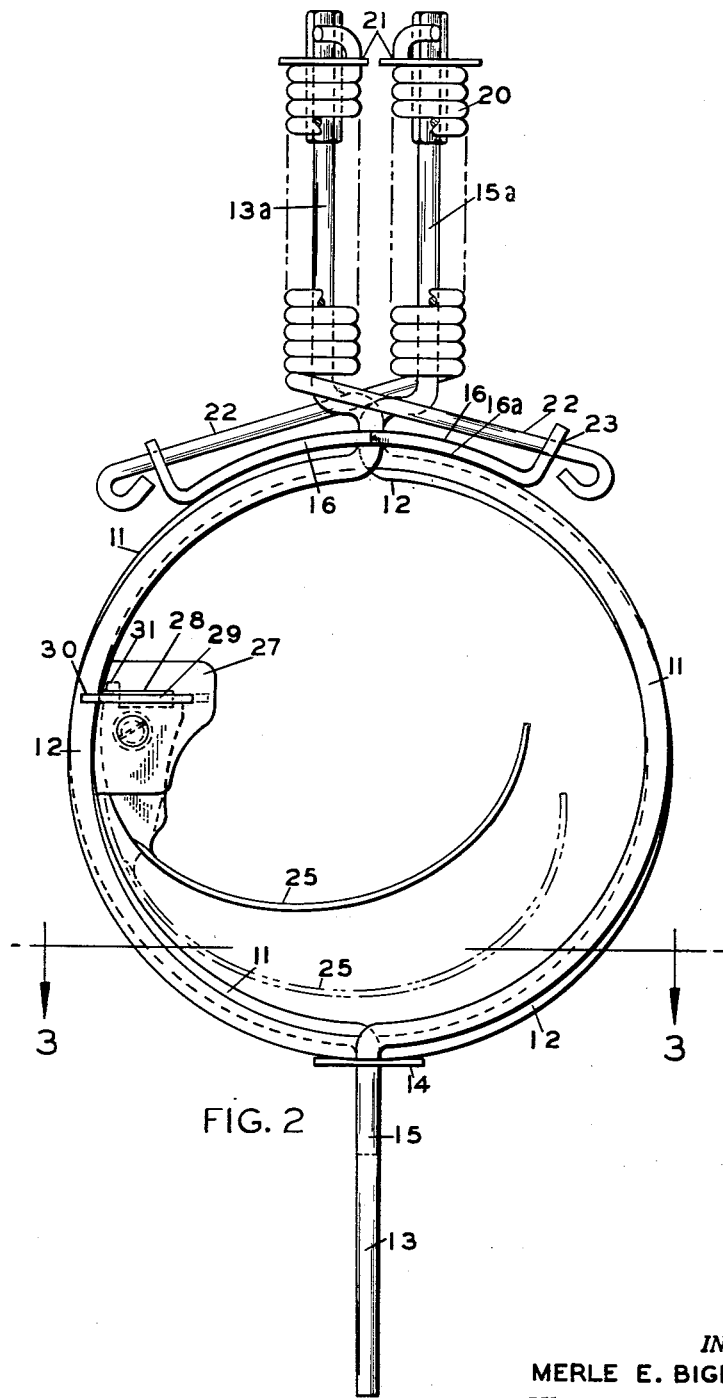
Figure 2 is an elevational view of the trap showing the face of the trap opposite to that which appears in Figure 1.

Diametrically opposite the disc 14, that is, at its upper closed side, the ring 11 carries a pivot and spring anchor bracket 16 which is rigidly secured thereto, at 16a (Figures 2 and 6) as by welding, and projects substantially tangentially from opposite sides of the pivot axis. The ring 12 at its lower closed side rests upon and is secured rigidly to the upper surface of the disc 14, as by welding at 14a, and passes between the pivot extensions 13 and 15 of the ring 11, these extensions being spaced just sufficiently forwardly and rearwardly to receive the ring 12 as shown best in Figures 3 and 5. The ring 12 passes upwardly and around in both directions (Figure 1) and is provided with the upstanding pivot extensions 13a and 15a on its upper ends. These pivot extensions 13a and 15a pass upwardly through pivot openings in the bracket 16, as shown in Figures 1 and 2. The pivots 13a and 15a are on opposite sides of the ring 11, and the pivots 13 and 15 are in axial or vertical alignment with the pivots 13a and 15a, respectively.

The pivot extensions 13a and 15a are bent laterally and upwardly to provide upstanding spring-supporting extensions. Each of these extensions receives a coil torsion spring 20, the upper end of which is anchored to the supporting extension at 21 and the lower end of which has an actuating arm 22 which fits in a notch 23 in the upturned end of the bracket 16. It will be apparent that since the bracket 16 is anchored to the ring 11 and since the spring-supporting extensions 13a and 15a are carried by the ring 12, the relative rotation of the rings into the trap set position shown in Figures 1 and 2, will wind the torsion springs to maximum force-exerting condition with the arms 22 thereof crossed in X-relationship as shown. Therefore, the springs 20 will tend to reverse the rotation of the rings 11 and 12 to trap-sprung position.

The trap is provided with trigger mechanism to be actuated by a trigger bar 25, which may be engaged by an animal to spring the trap after it is set as in Figures 1 and 2. This bar is pivoted at 26 to a latch-mounting plate 27 which is rigidly secured, as by welding to the ring 11 and projects radially thereinto along an axis substantially at right angles to the pivot axis of the rings 11 and 12. Mounted in a slot 28 (Figure 2) in the plate 27 for radial sliding movement is a latch 29. This latch 29 has a latch lug 30 in its outer end which will engage the other ring 12 when the trap is set. This latch 29 is moved radially by means of swinging the bar 25 about the pivot 26 since the pivoted end of the bar 25 is extended to provide a finger 31 entering an actuating socket in the latch 29. The full line position of the bar 25 in Figure 2 is the setting position for the trap, while the broken line position is the springing position for the trap.

When the set trap (Figures 1, 2 and 3) is sprung by an animal engaging the trigger arm 25, the springs 20 will swing the rings 11 and 12 relatively through 180°, or each one approximately 90°, it being understood that the trap will be set upright by means of the prong 13 being pushed into the ground. As the rings rotate toward trapping position, the force of the springs 20 decreases but when they move past dead-center position where they are in vertical planes at 90° (Figure 4) relative to each other, the spring tension in the metal of the rings will aid in bringing the rings into animal gripping position (Figure 5) or sprung position. When the rings 11 and 12 are again reversed to set the trap, the spring tension of the rings when they rotate relatively past dead-center will aid in moving the rings, against the force of the springs 20, again into the set position of Figures 1, 2, and 3.

Figure 5:
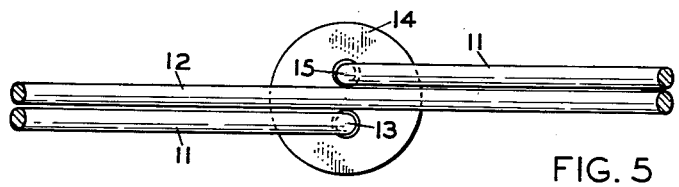
Figure 5 is a view similar to Figure 3 but showing the ring-like jaws in the sprung condition.
Figure 6:
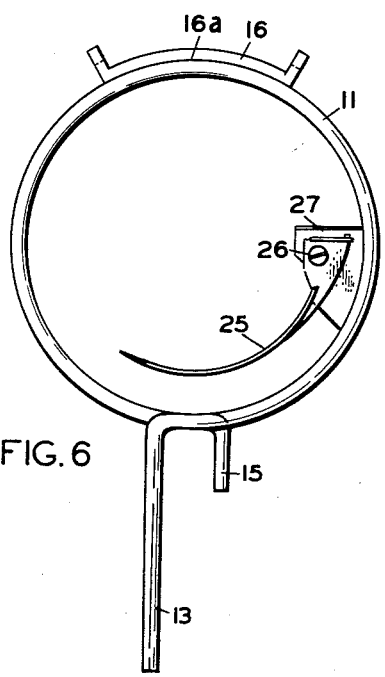
Figure 6 is an elevational view of one of the ring-like jaws used in the trap, showing it before assembly with the other ring-like jaw.
Figure 7:
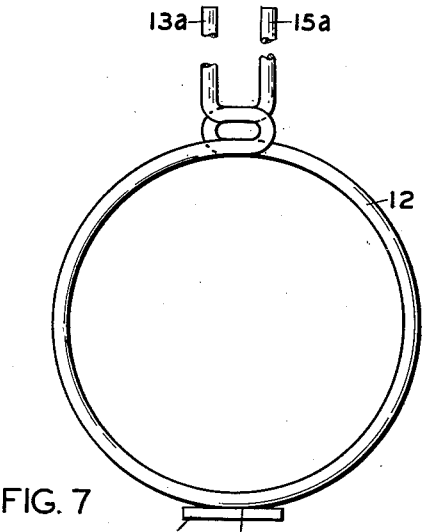
Figure 7 is a view similar to Figure 6 and showing the other ring-like jaw before assembly.

In order to obtain the operation of the rings as indicated above, they are preferably formed as indicated in Figures 6 and 7 which show such rings before they are assembled. To provide tension in each ring, it is initially contracted so that its split ends overlap. Thus, with the ring 11 of Figure 6, the pivot extension 15 is beyond the pivot extension 13 and with the ring 12 the pivot extension 13a is beyond the extension 15a. Therefore, in assembling the rings 11 and 12, the ends of each must be spread to obtain the condition illustrated in Figures 3 and 5 where the extensions 13 and 15 are diametrically opposite. Obviously, the extensions 13a and 15a are similarly arranged when the rings are assembled. Thus, because each ring is expanded in assembling against its inherent tension, it naturally tends to contract.

Figure 4:
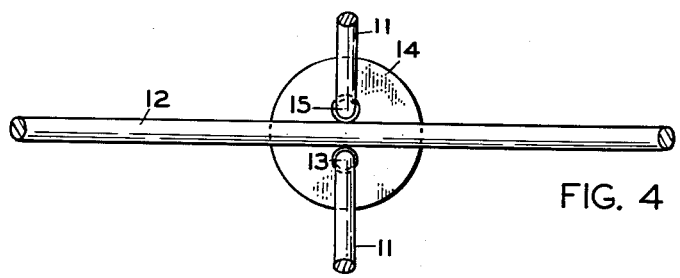
Figure 4 is a view similar to Figure 3 but showing the ring-like jaws in the halfway-position.
Figure 3:
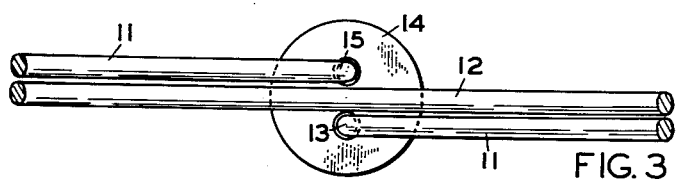
Figure 3 is a transverse sectional view taken along line 3—3 of Figure 2 showing the ring-like jaws in the set condition.

Figures 3 to 5 show the manner in which the relationship of the pivot extensions 13 and 15 change during the relative rotation of the rings 11 and 12. The relationship of the extensions 13a and 15a will change in the same manner. In these figures it is indicated that the ring 12 is stationary but in actual practice both rings swing but these figures indicate the relative movement of the rings. When the trap is set, as in Figure 3, and when it is sprung, as in Figure 5, the pivots 13 and 15 are directly opposite and the split ends of the ring 11 are not sprung apart in a circumferential direction although they are laterally offset the thickness of the ring 12. When the 90° relative position of the rings is reached, as shown in Figure 4, the ends of the ring 11 will be spread in a circumferential direction so that the ends and, consequently, the pivot extensions 13 and 15 will be spread apart the maximum extent, that is, the thickness of the ring 12. Thus, as the ring 11 swings into the 90° position of Figure 4, from the set position of Figure 3, it develops maximum tension in the ring and as the ring moves past the 90° position or dead-center, the tension will tend to contract the ring and this will aid in swinging the trap into the sprung position shown in Figure 5. As the ring 11 swings past the halfway point, it will contract since the pivot extensions 13 and 15 will move directly opposite each other again as shown in Figure 5. As previously indicated at the same time the ring 12 is being expanded and contracted by a similar changing of the relationship of the pivots 13a and 15a diametrically opposite the pivots 13 and 15. In the reverse rotation towards set position of the trap, the rings 11 and 12 will be similarly expanded into larger diameter and past the dead-center or 90° position will tend to contract and aid in moving the rings, against the force of the springs 20, into set position.

Thus, after the trap is sprung and the rings 11 and 12 swing toward trapping position, the force of the springs 20 decreases but at the halfway point, the inherent tension in the rings 11 and 12 tending to contract the spread rings, aids in snapping the jaws into trapping position. Also, as indicated above, setting of the trap is also aided by the tension in the rings. This tension will be present when the ends of the rings initially overlap as in Figures 6 and 7, or when the ends just meet with the pivots 13 and 15 directly laterally opposite but would not be present if the ends were initially spread apart.

It will be apparent that I provide an animal trap which includes two resilient split rings of heavy steel spring wire interfitting with their split sides diametrically opposed. The split side of the first ring is provided with pivot extensions in a first pivot support at opposite faces of the closed side of the second ring, the pivot support being rigidly secured to the closed side of the second ring. Similarly, the split side of the second ring is provided with pivot extensions in a second pivot support at opposite faces of the first ring, the pivot support being secured to the closed side of the first ring. This arrangement, plus the tension initially placed in the rings by having their ends overlap or at least meet, provides for shifting the pivots relatively in such a manner that as the pivoting rings move beyond center or the halfway position towards closed or opened positions, they inherently provide spring tension which aids in closing or opening the trap.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. An animal trap comprising first and second interfitting split rings of resilient material mounted for rotation about a pivot axis with the split side portion and closed side portion of said first ring being diametrically opposed to the split and closed side portions respectively of said second ring, the split side portion of the first ring being provided with pivot extensions, a first pivot support rigidly secured to the closed side portion of the second ring having openings receiving said pivot extensions, the split side portion of the second ring being provided with pivot extensions, a second pivot support rigidly secured to the closed side portion of the first ring having openings receiving said second-named pivot extensions, means for holding the rings in trap-set position to which they may be relatively rotated about said pivot extensions, said rings in trap-set position being under tension in flat contact with the two halves of each ring which are at opposite sides of the pivot axis contacting with the corresponding halves of the adjacent ring but at opposite faces thereof, and trigger mechanism for releasing said last-named means so that the rings will return by relative rotation about said pivot extensions into trap-sprung position where the two halves of each ring are in flat contact with corresponding halves of the adjacent ring but their positions are reversed 180° about said pivot axis relative to said trap-set position.

2. An animal trap according to claim 1 in which each of the rings has inherent tension tending to contract it.

3. An animal trap according to claim 1 in which torsion springs are carried by the two pivot extensions of one ring and are operatively connected to the pivot support of the other ring.

4. An animal trap according to claim 1 in which spring means is connected to the first and second rings for normally holding them in flat contact at said trap-sprung position.

5. An animal trap according to claim 4 in which the pivot extensions of each ring are rotatably mounted in openings in the associated pivot support disposed at opposed offset points at opposite faces of the other ring.

6. An animal trap according to claim 4 in which said means for holding the rings in said trap-set condition comprises latch mechanism on one ring for engaging the other ring when the rings are rotated relatively 180° into flat contact at said trap-set position, said trigger mechanism releasing said latch mechanism.

7. An animal trap according to claim 6 in which the spring means comprises coil torsion springs carried by the pivot extensions of one ring and connected thereto so that they may be wound thereon, and actuating arms extending from said springs and connected to the other of said rings.

8. An animal trap according to claim 7 in which one of the pivot extensions of one ring is extended to provide a prong for insertion into a surface to support the trap with its rings in upright position.

9. An animal trap according to claim 8 in which the rings are formed of heavy steel wire.

References Cited in the file of this patent

UNITED STATES PATENTS

| | | |
|---|---|---|
| 1,567,900 | Bigelow | Dec. 29, 1925 |
| 2,118,569 | Oswald | May 24, 1938 |
| 2,543,826 | Bigelow | Mar. 6, 1951 |